June 19, 1951  D. A. HAYNES  2,557,347
CONVERTIBLE CAMPING BODY FOR WHEELED VEHICLES
Filed June 2, 1948  2 Sheets-Sheet 1
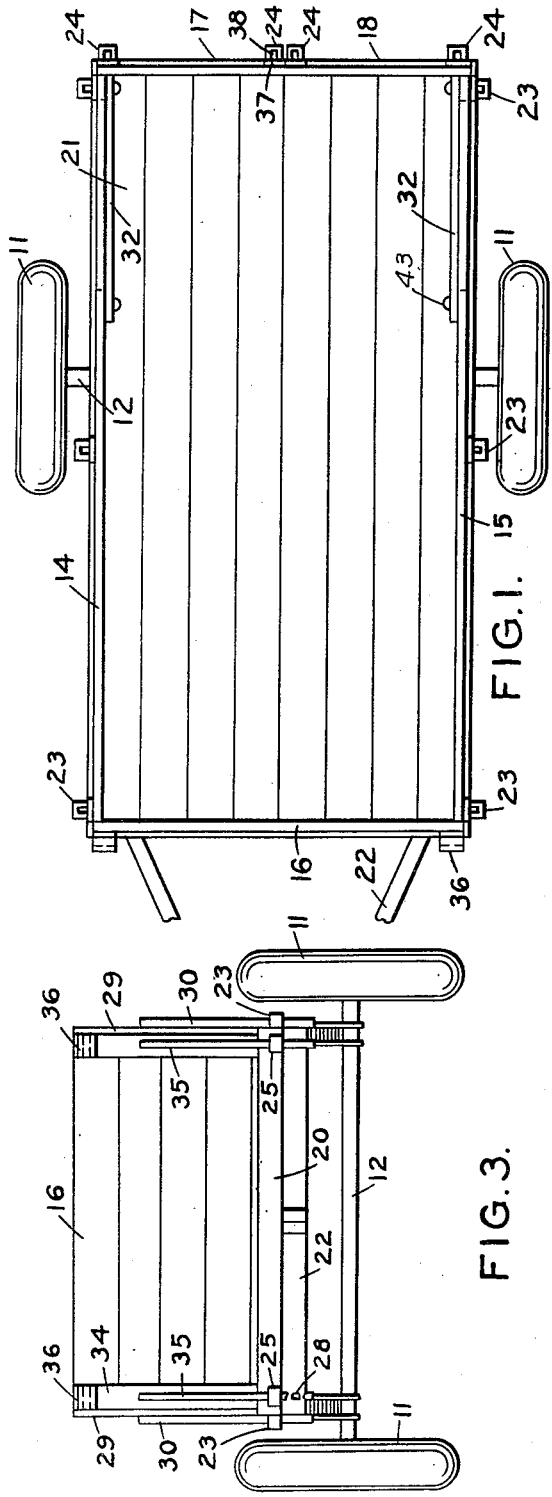
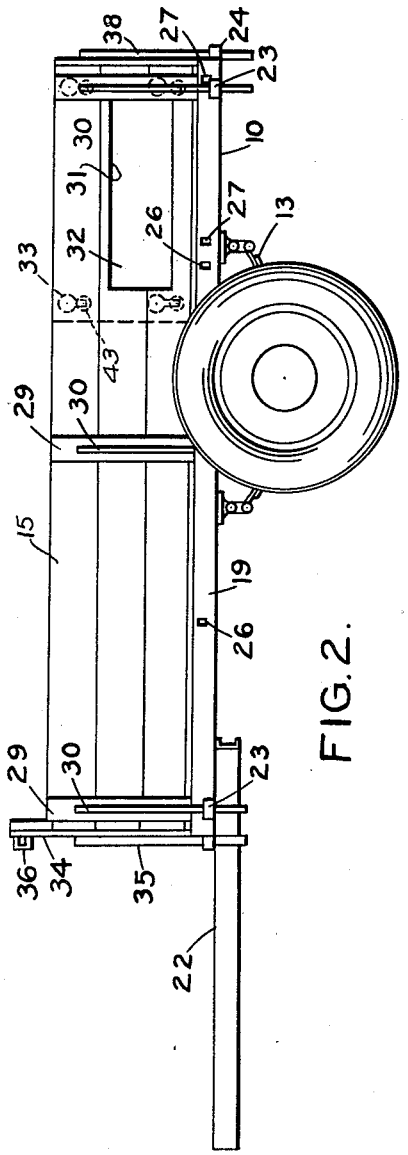
INVENTOR.
Don A. Haynes.
BY
Richard A. Parsons
ATTORNEY.

June 19, 1951  D. A. HAYNES  2,557,347
CONVERTIBLE CAMPING BODY FOR WHEELED VEHICLES
Filed June 2, 1948  2 Sheets-Sheet 2

INVENTOR.
Don A. Haynes.
BY
Richard A. Parsons
ATTORNEY.

Patented June 19, 1951

2,557,347

UNITED STATES PATENT OFFICE 2,557,347

CONVERTIBLE CAMPING BODY FOR WHEELED VEHICLES

Don A. Haynes, Lansing, Mich.

Application June 2, 1948, Serial No. 30,600

3 Claims. (Cl. 296—23)

This invention relates to vehicle bodies and particularly to those of the box body type, such as are used on trucks and trailers.

The invention is particularly applicable to utility trailers, but it may be utilized in connection with truck or wagon bodies.

The principal object of the present invention is to provide a vehicle body of the general utility type which may be easily converted to a shelter for people when camping.

Another object of the invention is to provide a load carrying body having a flat platform, and upright sides which may be moved to a horizontal position in the plane of the platform to increase the size of the latter.

These objects will more fully appear in the following specification, when read in connection with the accompanying drawings, wherein:

Figure 1 is a plan view of a trailer body embodying the invention;

Figure 2 is a side elevational view of the trailer body;

Figure 3 is a front elevational view of the trailer body;

Figure 4:
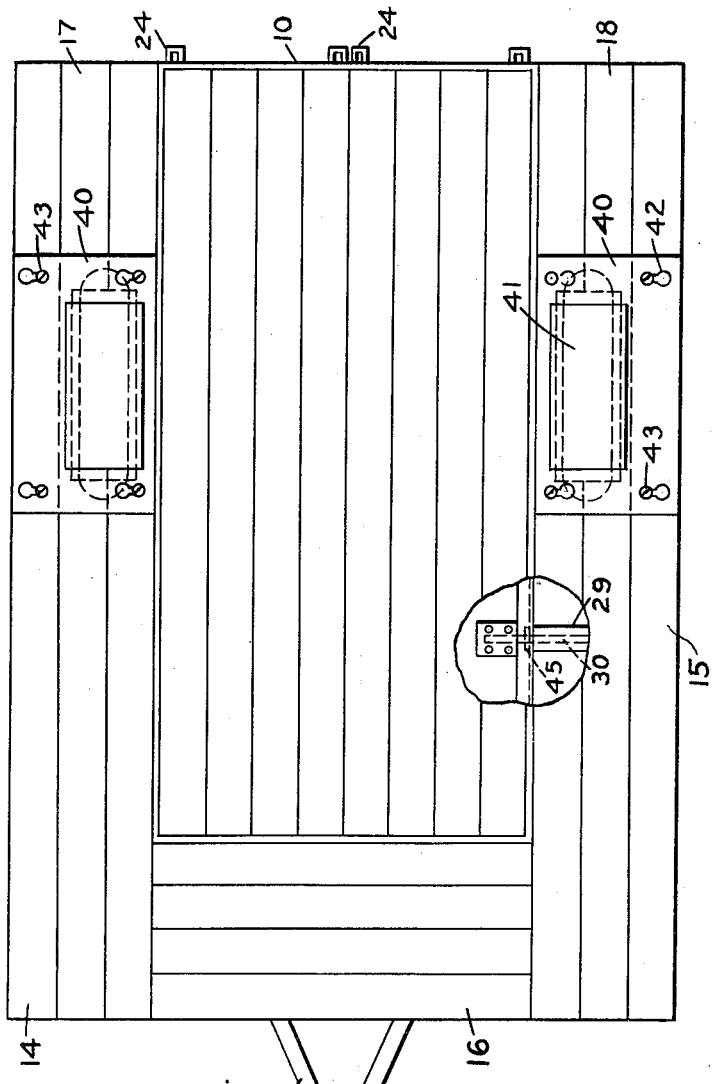
Figure 4 is a plan view of the trailer body with the upright walls placed in a horizontal position and connected to the platform.

The trailer shown in the drawings comprises a platform 10 supported by wheels 11 connected to an axle 12 which in turn is attached to the trailer platform by conventional springs 13. The platform is surrounded by a pair of upright side walls 14 and 15, a front end wall 16, and a pair of cooperating rear end walls 17 and 18. The construction of these parts will more fully appear presently.

The platform 10 is preferably composed of a rectangular frame formed of steel channel members on which a floor 21 is laid. Two longitudinal channel members 19 form the sides of the frame. The members 19 are connected together at their front and rear ends by transverse channel members 20. The channel members 19 and 20 are welded together at the corners to form the frame. Preferably the webs of the channel members are vertical and the flanges extend inwardly therefrom. Suitable additional transverse members may be connected to the side channel members 19 to aid in supporting the floor 21. The floor consists of a plurality of flat planks laid on the frame and attached thereto.

Attached to the frame at the forward end thereof is a suitable hitch 22 by means of which the trailer can be connected to a towing vehicle.

Stake pockets 23 are connected to the longitudinal frame members 19, as indicated in Figures 1 and 2. The stake pockets may be U-shaped steel brackets which are welded to the members 19. Preferably there are three pockets on each member 19, and they are equi-distantly spaced. Similar pockets 24 and 25 are connected to the rear and front frame members 20, as indicated in the drawings, two stake pockets 25 at the front of the trailer, and 4 of the pockets 24 at the rear thereof.

Rectangular openings 26 and 27 are formed in the webs of the longitudinal frame members 19. The spacing of the openings 26 and 27 is the same in both members 19 and will be more fully described presently.

A pair of rectangular openings 28 are formed in the front frame members 20.

The upright side walls 14 and 15 are composed of a plurality of flat planks or strips of metal connected together by spaced cleats 29. The latter are preferably of metal. The planks may be secured to the cleats 29 in any suitable manner. Connected to each cleat and extending downwardly therefrom is a stake 30. These stakes are of rectangular cross-section and the lower ends thereof are adapted to fit within the openings in the pockets 23, thereby holding the side walls 14 and 15 in upright position.

Each side wall is also provided with a rectangular opening 31. This opening is closed when in the upright position by a flat plate 32, preferably of metal. The plate 32 has four keyhole slots 33 formed therein adjacent the corners thereof. These slots receive the heads of bolts or screws 43 attached to the side walls in the positions indicated in Figures 1 and 2. The plates 32 may be placed on the side walls 14 and 15 over the openings 31 by inserting the heads of the bolts 43 through the larger parts of the keyhole slots and moving the plates upwardly so as to lock the plates 32 in place. Preferably the plates 32 are attached to the side walls when the latter are either disconnected from the trailer platform or in the horizontal position to be later described.

The front end wall 16 comprises a plurality of horizontally extending planks or strips connected by cleats 34 in the same manner as the cleats 29 previously described. Stakes 35, similar to stakes 30, are connected to the cleats and are received in the stake pockets 25. At the upper ends of the cleats 34 are a pair of stake pockets 36. These stake pockets are of U-shaped configuration with the free ends of the flanges thereof welded or otherwise fastened to the cleats. The openings in the pockets 36 extend horizontally, however, instead of vertically, as in the case of the pockets 23, 24 and 25.

The rear end of the trailer body is closed by the end walls 17 and 18 previously mentioned. These end walls are composed of horizontally extending planks connected by cleats 37 and having stakes 38 attached thereto. The stakes 38 are received in the stake pockets 24 in the manner shown in Figures 1 and 2.

From the foregoing it will be seen that when the side and end walls are arranged in their upright positions with the stakes 30, 35 and 38 received in their respective stake pockets, a rectangular box-shaped utility trailer body is provided.

Figure 5:
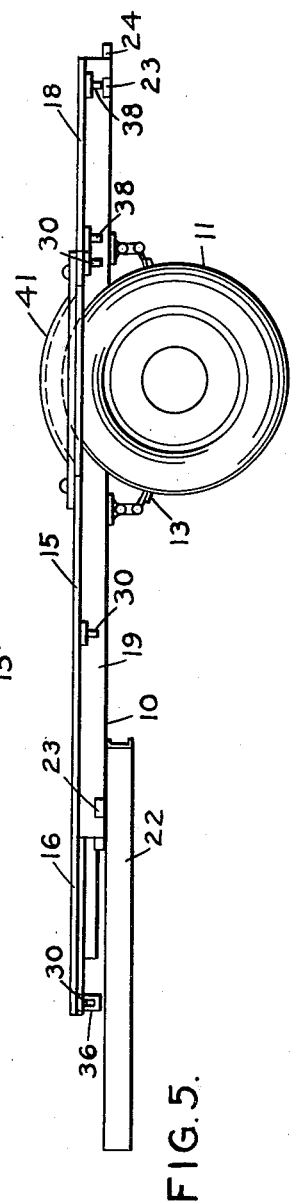
Figure 5 is a side elevational view of the platform as shown in Figure 4.

When it is desired to increase the area of the trailer platform, the side walls 14 and 15 and end walls 16, 17 and 18 can be removed from their upright position and connected to the platform 10 in a horizontal position, as shown in Figures 4 and 5. The front wall 16 is lifted out of the position shown in Figures 1 to 3, and the stakes 35 thereon are inserted into the rectangular openings 28 formed in the front end channel member 20 of the platform frame. The side walls 14 and 15 are removed from their positions shown in Figures 1 and 2, and placed in a horizontal position forward of the positions shown in Figures 1 and 2, with the front ends of the side walls flush with the front edge of the front wall 16 when it occupies its horizontal position. The center and rear stakes 30 on each side wall then are inserted in the openings 26 in the longitudinal frame members 19. The front stake 30 is inserted in the corresponding stake pocket 36 on the front end wall 16.

The two sections 17 and 18 of the rear end wall are removed from their upright positions and connected to the longitudinal frame members 19 to fill in the spaces at the rear ends of the side wall members 14 and 15. When in the horizontal position the stakes 38 are inserted in the rectangular openings 27 in the longitudinal frame members 19. Thus, a rectangular platform of considerably larger size than the original platform of the trailer body is formed.

The various walls 14, 15, 16, 17 and 18 may be positively held in their horizontal positions by various means. It is preferred, however, to insert a pin, such as a cotter pin 45, through a hole in each stake which is located inwardly of the webs of the longitudinal frame members 19. See Figure 5 particularly. The cotter pins hold the walls 14, 15, 17 and 18 in place, while the stakes 30 at the front ends of walls 14 and 15 hold the front wall 16 in place by virtue of the engagement of the stakes with the stake pockets 36.

It will be noted that in the trailer shown in the drawings the wheels 11 extend above the floor level of the trailer platform. In order that the side members 14 and 15 may be placed in the horizontal plane of the platform 10, openings must be provided to receive the wheels. That is the purpose of the openings 31 previously described. Accordingly, when the side walls 14 and 15 are placed in the position shown in Figures 4 and 5, the plates 32 are removed. Preferably these openings 31 and the upper portions of the wheels 11 are then covered by special plates 40. These plates 40 have upwardly extending wheel housings 41 formed therein to receive the wheels. The plates 40 are provided with key hole slots 42 by means of which the plates 40 can be attached to the heads of the bolts 43 in the same manner as the plates 32 were attached to the side walls.

The trailer with its enlarged platform shown in Figures 4 and 5 may be utilized to hold objects too large to go into the trailer body shown in Figures 1 to 3. The principal use of the enlarged trailer platform, however, is to support a collapsible canvas shelter in a form similar to a house trailer. No particular form of shelter is necessary, as the trailer may be adapted to a number of different types. The enlarged trailer platform is even suitable for supporting a conventional tent, if suitable poles are provided.

It will thus be seen that the present invention is an all purpose trailer which may be utilized either as a utility trailer for holding various articles, or it may be used as a platform for a shelter while camping.

While the invention has been described in connection with a trailer, it is apparent that it may be applied to the platform of a truck or wagon or similar conveyance.

The scope of the invention is indicated in the appended claims.

I claim:

1. A vehicle body including a platform supported by wheels, a plurality of vertically extending stake pockets connected to the sides of said platform, upright side and end walls having depending stakes received in said stake pockets, said platform having horizontal openings in the sides and one end thereof, the openings in the sides of said platform being spaced forwardly of the locations of the corresponding stake pockets on the sides of the platform by distances substantially equal to the height of the front end wall, said openings in the end of the platform being positioned to receive the stakes on the corresponding end wall and the openings in the sides of the platform being positioned to receive certain of the stakes on the side walls to support said walls in horizontal positions in the plane of the platform.

2. A vehicle body including a platform supported by wheels, a front end wall, a pair of side walls and a rear wall comprising two separate sections, depending stakes on said walls, stake pockets attached to said platform at the sides and ends of said platform removably receiving said stakes and supporting said walls in upright positions, a pair of horizontal stake pockets adjacent the upper corners of said front wall, said platform having horizontal openings at the front end thereof positioned to receive the stakes on the front wall to support said front wall in a horizontal position, said platform having horizontal openings in each side thereof positioned to receive all of the stakes on a side wall and a section of said rear end wall except the forward stake on the corresponding side wall, said last named stake on each side wall being adapted to be received in the corresponding horizontal stake pocket on the front wall when the latter is in its horizontal position.

3. A vehicle body including a platform supported on wheels, a front end wall extending from side to side of said platform, a pair of side walls extending only from front to rear of said platform on opposite sides thereof, a rear wall extending from side to side at the rear end of said platform and composed of separate sections of equal size, means on said side walls and platform for supporting said walls in upright positions to form a box-like body, means for supporting the front end wall in a horizontal position flush with the platform and juxtaposed to the front end thereof, means on said platform and front end wall for supporting said side walls in horizontal positions at opposite sides of said platform with the front ends of said side walls aligned with the front edge of the front end wall when the latter is in its horizonal position, and means for supporting said sections of said rear end wall in horizontal positions on opposite sides of said platform and juxtaposed to said platform and the rear ends of said side walls when the latter are in their horizontal positions.

DON A. HAYNES.

REFERENCES CITED

The following references are of record in the file of this patent:

UNITED STATES PATENTS

| Number | Name | Date |
|---|---|---|
| 84,892 | Marcy | Dec. 15, 1868 |
| 863,382 | Giller | Aug. 13, 1907 |
| 1,034,028 | Onsrud | July 30, 1912 |
| 1,060,418 | Beach et al. | Apr. 29, 1913 |
| 1,134,877 | Larson | Apr. 6, 1915 |
| 1,283,898 | Reid | Nov. 5, 1918 |
| 2,054,122 | Eisenberg, Jr. | Sept. 15, 1936 |
| 2,298,530 | Fletcher | Oct. 13, 1942 |